No. 607,757. Patented July 19, 1898.
A. J. MADDEN.
CHAINLESS GEAR FOR VELOCIPEDES.
(Application filed Dec. 18, 1897.)
(No Model.)
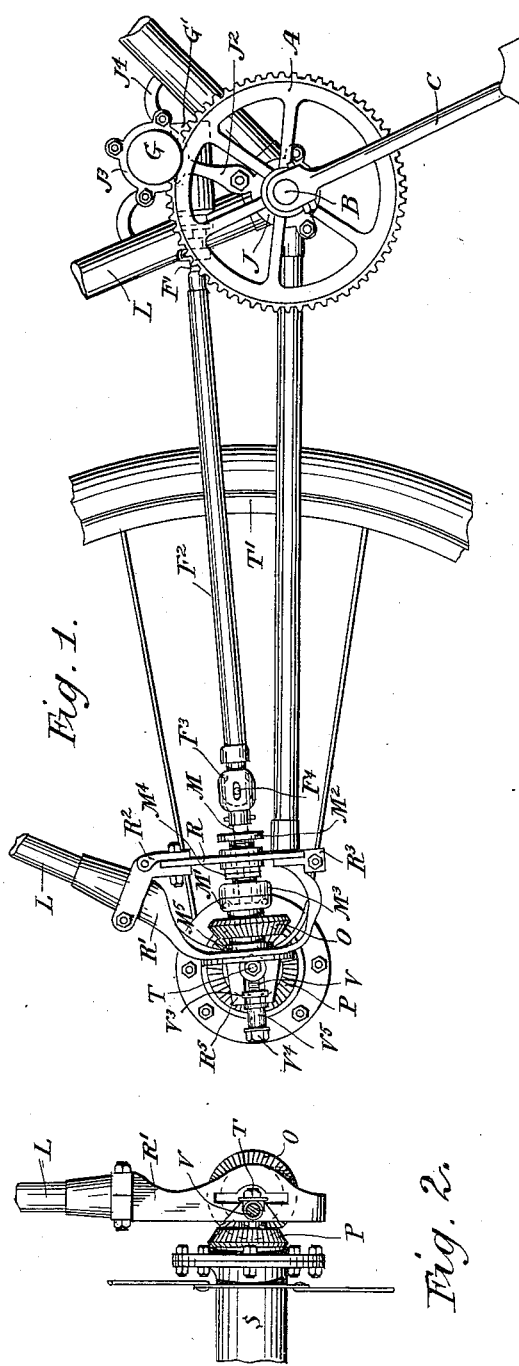
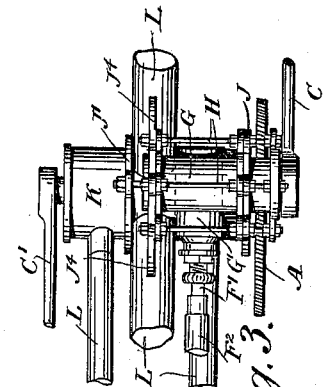
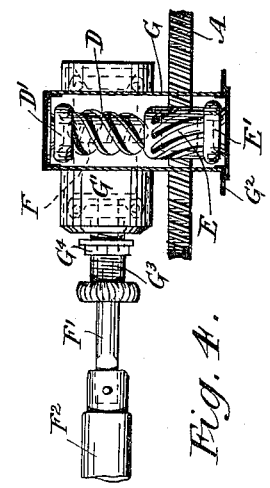
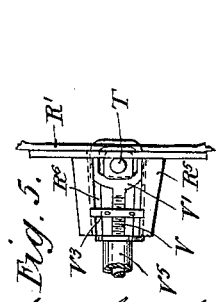
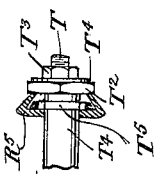

UNITED STATES PATENT OFFICE.

AUGUSTINE JOHN MADDEN, OF MELBOURNE, VICTORIA.

CHAINLESS GEAR FOR VELOCIPEDES.

SPECIFICATION forming part of Letters Patent No. 607,757, dated July 19, 1898.

Application filed December 18, 1897. Serial No. 662,480. (No model.)

*To all whom it may concern:*

Be it known that I, AUGUSTINE JOHN MADDEN, metal-worker, a subject of the Queen of Great Britain, and a resident of Union Lane, Melbourne, in the Colony of Victoria, have invented a certain new and useful Chainless Gear for Velocipedes, of which the following is a specification.

This invention provides improvements in the driving-gear of bicycles and other cycling machines in which the chain is dispensed with and in place thereof motion is communicated from the pedal-axle to the driving-wheel axle by means of a rotating shaft and gearing connected therewith.

In order to make my invention clear, I will now refer to the accompanying sheet of drawings, in which—

Figure 1 shows an elevation of the complete mechanism embodying my improvements. Fig. 2 shows an end elevation of same. Fig. 3 shows plan of a portion of Fig. 1. Fig. 4 shows plan, with casing removed, of the gearing connected with the toothed wheel upon the pedal-axle. Figs. 5 and 6 show details of parts of the mechanism.

A represents a wheel which takes the place of the usual main sprocket-wheel and is set upon the pedal-axle B and has the pedal-lever C intimately attached to it. The periphery of this wheel is provided with teeth which are set in a diagonal manner, but may, if preferred, be either beveled or straight cut. Above this wheel A a worm D, Fig. 4, is set. The end of this worm carries a pinion E, which gears with the aforesaid toothed wheel A. The worm D is arranged to operate a worm-wheel F, set beneath it, such worm-wheel being set upon the end of a rod F', to which the main connecting-rod F² is secured.

The worm D (with attached pinion E) and the pinion F are set within a dust-tight casing, which is formed of two cylinders G G', set at an angle to each other (such angle being controlled by the width of tread and the hub of driving-wheel of the machine) and connected together. The cylinder G has openings through which the pinion E and the worm D project to engage with the toothed wheel A and the worm-wheel F, respectively. The end of the worm D and the end of the pinion E are formed with cups D' E' to carry the balls forming the bearings. The ends of the cylinder G carry cones to complete such bearings, and these are adjusted by being screwed in or alternately by means of cross-bolts H H, which pass through lugs G² in one end of the cylinder and through framing which supports the said casing, as hereinafter described. The worm-wheel F is attached to an enlarged portion of shafting whose ends terminate in cups similar to the ends of the worm D and pinion E. One end of the cylinder G' carries a cone, while the other end has an adjustable bearing formed by a sleeve G³, which terminates in a cone, the said sleeve being set at the required position by means of a nut G⁴, which screws up against the cylinder G'. The rod F' aforesaid passes through this sleeve and is attached to the worm-wheel F.

The casings G G' are supported above the center bracket of the machine by means of stays set at any required position. I have illustrated particular framing to carry the casings, but it will be understood that such construction is not arbitrary.

J J', Fig. 3, are rings which encircle the center bracket K of the machine, the ring J having an upwardly-extending arm J², carrying a ring J³, which encircles the cylinder G at one end, while the other end of the cylinder is supported from stays J⁴, which are connected with the ordinary framing L of the bicycle. The whole is bolted together by the necessary bolts, so as to form a staunch construction.

The connecting rod or tube F² is secured through the medium of a universal joint at F³ to shaft M, which is practically a continuation of F². The universal joint is formed so as to allow of a radial movement in any direction for the rod F², and in addition to such movement a slight horizontal movement is permitted. This latter is made effectual by means of a pin F⁴, which is set through the ball-head of the rod F² and which passes through a slot formed in a casing in which the ball-head is placed. The rod M passes through a framing R and is connected with a cup M', in which the ball-bearings are arranged, and to this cup is mounted the shaft upon which a bevel-wheel O is secured, which gears with similar bevel-wheel P, connected with the hub S of the driving-wheel of the bicycle. The ball-bearing at M' is made adjustable by means of screw-sleeve $M^2$. Lock-nuts $M^4$ are provided to secure it at the required position.

$M^3$ represents a cover which may be screwed close up against the cup M' to protect the bearing from dust. A second bearing for the shaft M is provided at $M^5$.

The framing which carries the shaft M is preferably formed of a plate R, set in a recess between framing R' and hinged piece $R^2$ and being at its bottom ends secured with movable piece $R^3$ by nut and bolt to the portion R', which latter is carried around so as to form a double bearing for this end, as described. This frame also carries recessed lugs $R^5$, through which the axle T of the driving-wheel T' of the machine passes, and is secured by means of nuts $T^2$ $T^3$ and collar $T^4$, Fig. 6.

I provide means of adjusting the position of the bevel-wheels O P relatively to one another. This consists of a threaded bolt V, whose enlarged end is arranged to encircle the axle T, the side of such end being arranged to enter dovetailed recesses $R^6$ in the lugs $R^5$. The axle T is moved back or forward by operating-nut $V^3$ upon the bolt V, which lies within lateral recesses in the lugs $R^5$. The axle may be locked in position by means of a nut $V^4$, acting against sleeve $V^5$, which is thus screwed up against the ends of the lugs. Any lateral movement is prevented by the bolt V, whose end V' falls into a recess $T^5$ on either side of the enlarged portion $T^4$ of the axle T. (See Fig. 6.)

The bevel-gearing is preferably set within a dust-tight casing, and the connecting rod or tube $F^2$ may be inclosed to prevent such parts when revolving from catching the clothing of the rider.

By means of the universal joint at $F^3$ a certain amount of play is allowed to the connecting-rod $F^2$, so that the shocks caused by traveling over rough surfaces or by slight accidents to the machine will not have the tendency to put the mechanism "out of gear."

Lubrication may be arranged for throughout the wearing parts either by perforating or grooving same in any approved manner.

I may dispense with the use of the universal joint at $F^3$ and connect the shaft $F^2$ directly to the shaft M in lieu thereof.

In operation when the pedal-cranks C C' are rotated the toothed wheel A revolves and operates E and therewith the worm D. D transmits its rotary motion to the worm-wheel F, so as to revolve F', the rod or tube $F^2$, (which is attached thereto,) and, through the medium of the universal joint at $F^3$, the shaft M and bevel-wheel O. This latter in its turn causes the corresponding bevel-wheel P to revolve, carrying with it the driving-wheel N of the machine.

I do not confine myself to any sizes nor proportions of the parts to one another, nor to the details of construction, as I may vary same without departing from my invention; neither do I confine myself to any particular material for constructing the parts, but have found steel to be a suitable metal for the purpose.

Having now particularly described and ascertained the nature of my said invention and in what manner the same is to be performed, I declare that what I claim is—

In a bicycle, the combination of a pedal-axle, a gear-wheel mounted on said axle, a worm and a pinion mounted in ball-bearings in a dust-proof casing consisting of the cylinder G mounted upon a support comprising rings J J adapted to encircle the central bracket K of the bicycle, said ring J having an upwardly-extending arm $J^2$ carrying a ring $J^3$ adapted to encircle the cylinder G at one end, the opposite end of said cylinder being supported by stays $J^4$ connected with the frame of the bicycle, a worm-wheel secured upon a shaft mounted in ball-bearings and housed in a suitable dust-proof casing set at right angles to casing G, said worm-wheel adapted to transfer motion from said pinion to a connecting-rod connecting said shaft with a shaft contiguous the axle of the rear wheel by means of a universal joint, and suitable means interposed between said rear shaft and the axle of the drive-wheel for imparting motion to said drive-wheel, substantially as specified.

Signed at Melbourne, in the Colony of Victoria, this 29th day of October, 1897.

AUGUSTINE JOHN MADDEN.

Witnesses:
A. O. SACHSE,
A. HARKER.